United States Patent [19]

Stephens

[11] Patent Number: 4,494,562
[45] Date of Patent: Jan. 22, 1985

[54] FLOAT VALVE SYSTEM FLOW PROPORTIONING DEVICE

[75] Inventor: James B. Stephens, La Crescenta, Calif.

[73] Assignee: Coast Foundry & Manufacturing Company, Pomona, Calif.

[21] Appl. No.: 504,293

[22] Filed: Jun. 14, 1983

[51] Int. Cl.³ ............... F16K 47/00; F16K 31/22
[52] U.S. Cl. .................... 137/436; 137/441; 137/444; 138/45; 138/46; 251/118
[58] Field of Search ............ 137/436, 437, 441, 444; 138/45, 46; 251/118, 120

[56] References Cited

U.S. PATENT DOCUMENTS

| | | | |
|---|---|---|---|
| 1,038,014 | 9/1912 | Stack | 137/436 |
| 1,525,334 | 2/1925 | Stengel | 137/436 |
| 2,033,442 | 3/1936 | Morris | 137/441 |
| 2,304,272 | 12/1942 | Mueller et al. | 137/436 |
| 2,635,622 | 4/1953 | Owens | 137/437 |
| 2,779,350 | 1/1957 | Owens | 137/436 |
| 2,791,235 | 5/1957 | Smith | 137/437 |
| 3,070,118 | 12/1962 | Antunez, Jr. | 137/436 |
| 3,516,094 | 6/1970 | Reagan | 137/436 |
| 3,785,397 | 1/1974 | Young | 137/436 |
| 4,408,361 | 10/1983 | Rozek | 137/436 |

*Primary Examiner*—George L. Walton
*Attorney, Agent, or Firm*—Donald D. Mon; David O'Reilly

[57] ABSTRACT

A flow proportioning control for proportioning flow from a water level sensing valve. A barrier is positioned downstream from the valve adjacent to a refill line. A restrictor ring is positioned on said barrier with a portion overlying the upper surface of the refill line. It is interchangeable so that by substituting rings of various sizes, various proportions of flow can be selected.

5 Claims, 3 Drawing Figures

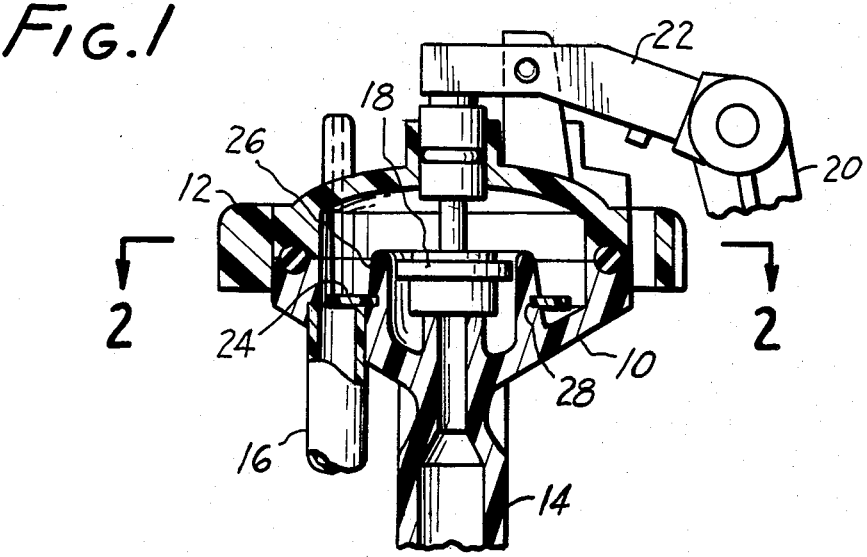
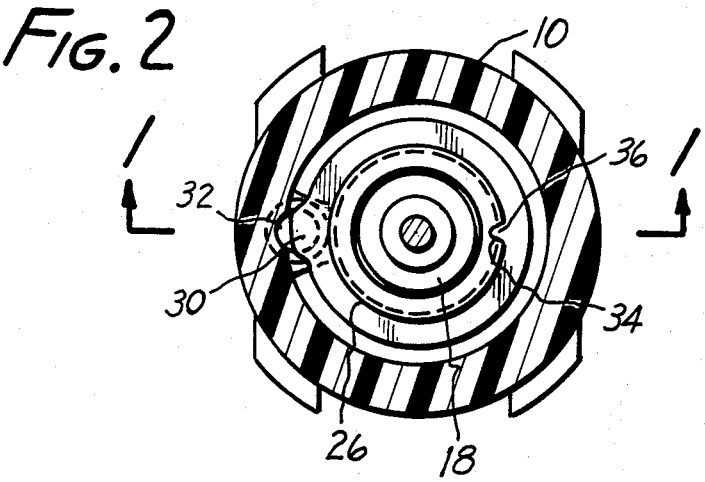
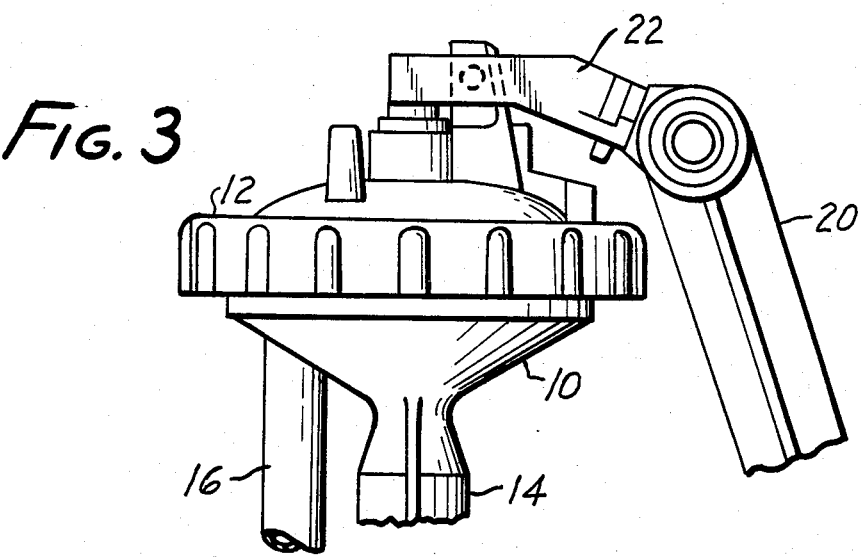

FLOAT VALVE SYSTEM FLOW PROPORTIONING DEVICE

FIELD OF THE INVENTION

This invention relates to toilet float valve systems and more particularly relates to flow proportion devices.

BACKGROUND OF THE INVENTION

In a toilet bowl flushing sequence water is dumped into the toilet bowl from a storage tank through a conventional flush valve. A float valve system having a water level responsive valve immediately begins to supply water to the storage tank to continue the flushing sequence until all waste material is cleared and the toilet bowl is partially filled, providing a gas tight seal. As the float valve begins to fill the tank, the flush valve closes, stopping the flow of the water to the bowl. If the tank fills too quickly the flush valve may close before there is sufficient water in the bowl to form a gas tight seal. If the flow is too slow all the waste material may not be cleared from the bowl. The problem is compounded by the fact that not all storage tanks and flush bowls have the same capacity.

For this reason, it is known practice to put an adjustable flow restrictor in the float valve system to adjust the refill rate to suit the tank and bowl volumes. These flow restriction valves necessarily increase the cost and complicate the construction of the float valve system. Further, they are not fixed and can be misadjusted by a user to present a health hazard. The user might, for example, adjust this valve one way or the other thinking it would correct a flushing problem not realizing its purpose. It would be desirable if means could be provided to achieve a predetermined proportional flow which could remain fixed once selected.

It is therefore one object of the present invention to provide a selectable flow proportion means for a float valve.

BRIEF DESCRIPTION OF THE INVENTION

A flow proportioning control for a float valve system which may be interchangeably inserted to fix the flow rate between a supply line and a tank refill line. The proportional control is in the form of a ring having dimensions which limit the flow from a supply line to a tank refill line to control the tank refill rate. The ring is easily installed in the float valve assembly by slipping over a cylindrical barrier surrounding a water responsive valve. The proportional flow is selected by varying the ring outer diameter and/or including an extension or tab which limits flow through the tank refill line.

According to an optional but desirable feature of the invention the ring can be constructed to slip inside the cylindrical barrier to limit flow from the supply line. In this case the ring would fit inside the cylindrical barrier to restrict flow to the tank refill line.

The above and other features of the invention will be fully understood from the following detailed description and the accompanying drawings, in which:

BRIEF DESCRIPTION OF THE DRAWINGS

FIG. 1 is a sectional view of a float valve system taken at 1—1 of FIG. 2;

FIG. 2 is a top view of the float valve system taken at 2—2 of FIG. 1; and

FIG. 3 is a side elevation of the float valve system.

DETAILED DESCRIPTION OF THE INVENTION

A toilet tank float valve as illustrated generally in FIGS. 1-3, is comprised of valve housing 10, a cap 12, a water supply line 14, and a tank refill line 16. Water from supply line 14 flows into valve housing 10 to tank refill line 16 through a water level sensitive valve 18 operated by float arm 20. A float (not shown) on the end of arm 20 operates lever 22 to open and close valve 18.

Since all tanks and toilet bowls are not the same volume some means must be provided to adjust flow to the tank refill line to balance the system according to the volume of the tank and toilet bowl. To accomplish this without complicated valve mechanisms, a restricting ring 24 is inserted in the valve housing around cylindrical barrier 26 surrounding the valve 18. The ring 24 is selected according to the tank and bowl volume as there is no need for changing the rate of flow to the toilet bowl tank once the proper flow rate has been established. The ring 24 is selected to have a diameter which restricts the flow of water through valve 18 over cylindrical barrier 26 to tank refill line 16 at a rate which provides proper flushing and tank refilling.

The ring 24 can be a simple ring which slips over the cylindrical barrier 26, or can be somewhat resilient to expand and return to seat in groove 28 provided in the exterior wall of the cylindrical barrier to prevent it from being dislodged by the turbulent flow of water from supply line 14 to tank refill line 16. The ring 24 will simply slip over cylindrical barrier 26 and be pushed down to snap into the annular groove 28. The ring can be outside the cylindrical barrier restricting flow to the tank refill line or inside the barrier restricting flow from the supply line. The general purpose is achieved by some insertable ring means for selecting proportional flow to provide proper flushing according to bowl and tank size.

Optionally, the ring can be provided with an extension 30 (FIG. 2) proportioned to close off flow to inlet 32 to tank refill line 26. Extension 30 is proportioned to provide the amount of restriction into the tank refill line 16 which determines the proper flow. To properly position the ring an extension slot 34 provided in the cylindrical barrier 26 mates with tab 36 on the ring 24 to key the ring for positioning extension 30 over tank refill line inlet 32.

As stated above, the ring can be inside or outside cylindrical barrier 26. When inside the barrier the ring would restrict flow from the supply line vis-a-vis restricting flow to the tank feed line. In any event, the overall effect would be the same. That is, the proportional flow is easily selected and determined by the diameter of the ring inserted.

This invention is not to be limited by the embodiments shown in the drawings and described in the description, which are given by way of example and not of limitation, but only in accordance with the scope of the appended claims.

I claim:

1. A flow proportioning control device for a float system to supply water to a tank which is released to a toilet bowl through a discharge valve, said float valve system comprising:

a supply line;

a water level responsive valve and valve seat; a valve barrier extending above and surrounding the valve seat and said water level valve; and a tank refill line being positioned adjacent said barrier and a rigid restrictor ring interchangeably surrounding and engaging an outer surface of said barrier; said restrictor ring engaging and overlying the upper surface of the refill line; said ring being so proportioned and arranged to partially obstruct the flow from said supply line to said tank refill line thereby providing means to attain a preselected proportional flow to said tank refill line, said restrictor ring being interchangeable from one size to another size for selectively varying the proportion of water which flows to said tank refill line.

2. The device according to claim 1 in which said ring dimensions comprise an outer diameter selected to produce the selected proportional flow.

3. The device according to claim 1 in which said ring includes an extension to produce the selected proportional flow.

4. The device according to claim 2 in which said ring includes means for rotationally holding said ring relative to said barrier.

5. The device according to claim 3 in which said positioning means comprises keying means on said ring engaging a key slot in said barrier.

* * * * *